(12) United States Patent
Yoshikawa et al.

(10) Patent No.: US 6,185,044 B1
(45) Date of Patent: Feb. 6, 2001

(54) TV LENS WITH STILL-TAKING FUNCTION

(75) Inventors: Kazuo Yoshikawa; Hisao Takemae, both of Omiya; Takami Hasegawa, Yokohama, all of (JP)

(73) Assignee: Fuji Photo Optical Co., Ltd., Saitama (JP)

( * ) Notice: Under 35 U.S.C. 154(b), the term of this patent shall be extended for 0 days.

(21) Appl. No.: 09/231,781

(22) Filed: Jan. 15, 1999

(30) Foreign Application Priority Data

| Jan. 19, 1998 | (JP) | 10-021445 |
| Jan. 20, 1998 | (JP) | 10-022839 |
| Jan. 20, 1998 | (JP) | 10-022840 |
| Jan. 8, 1999 | (JP) | 11-002846 |

(51) Int. Cl.$^7$ ................................................. G02B 27/14
(52) U.S. Cl. .................................................... 359/629
(58) Field of Search .................. 359/618, 627, 359/629, 630

(56) References Cited

U.S. PATENT DOCUMENTS

| 3,546,378 | 12/1970 | Karikawa | 348/344 |
| 3,622,786 | * 11/1971 | Godbarson, Jr. et al. | 250/363.01 |
| 3,709,582 | * 1/1973 | Walker | 359/733 |
| 4,009,942 | * 3/1977 | Hirose | 359/691 |
| 4,265,518 | * 5/1981 | Matsumura | 351/7 |
| 5,703,716 | * 12/1997 | Furata | 359/431 |

FOREIGN PATENT DOCUMENTS

| 1184 631 | 12/1964 | (DE) . |
| 86 10 736 | 8/1986 | (DE) . |
| 44 17 410 | 11/1994 | (DE) . |
| 43 40 682 | 6/1995 | (DE) . |
| 988288 | 4/1965 | (GB) . |
| 8-171043 | 7/1996 | (JP) . |
| 8-171044 | 7/1996 | (JP) . |

* cited by examiner

*Primary Examiner*—Ricky Mack
(74) *Attorney, Agent, or Firm*—Snider & Associates; Ronald R. Snider

(57) ABSTRACT

In a still-image-capturing system, a still-image-capturing lens group having totally the same configuration (the same number of lens sheets, lens form, and lens material) as the lens group used only for a TV-image-capturing system is disposed downstream a half mirror, and a rectangular prism is disposed for providing a luminous flux with an optical path length identical to that within a color-decomposing prism when the luminous flux passes therethrough. In another aspect, a focal length conversion lens group for changing the focal length of zoom lens groups and a total reflection mirror is disposed on the optical axis of the zoom lens groups exclusively from each other. In still another aspect, an electronic still camera is attached to the still-image-capturing system. If the size of each of image-capturing devices in the TV-image-capturing system is the same as that of the image-capturing device of the electronic still camera, letting the focal length of the fifth lens group be $f_A$, the focal length of the taking lens of the electronic still camera be $f_B$, and the converter magnification of the converter lens be $M_C$, the converter lens satisfying the expression of $f_A = M_C \cdot f_B$ can make the angles of views of the TV-image-capturing and still-image-capturing systems coincide with each other. In still another aspect, a mechanical shutter is disposed between the half mirror and the still-image-capturing lens group, such as to be opened only during the charge storage period of the first field in response to an image readout operation for one frame.

20 Claims, 12 Drawing Sheets

STILL-IMAGE-CAPTURING SYSTEM

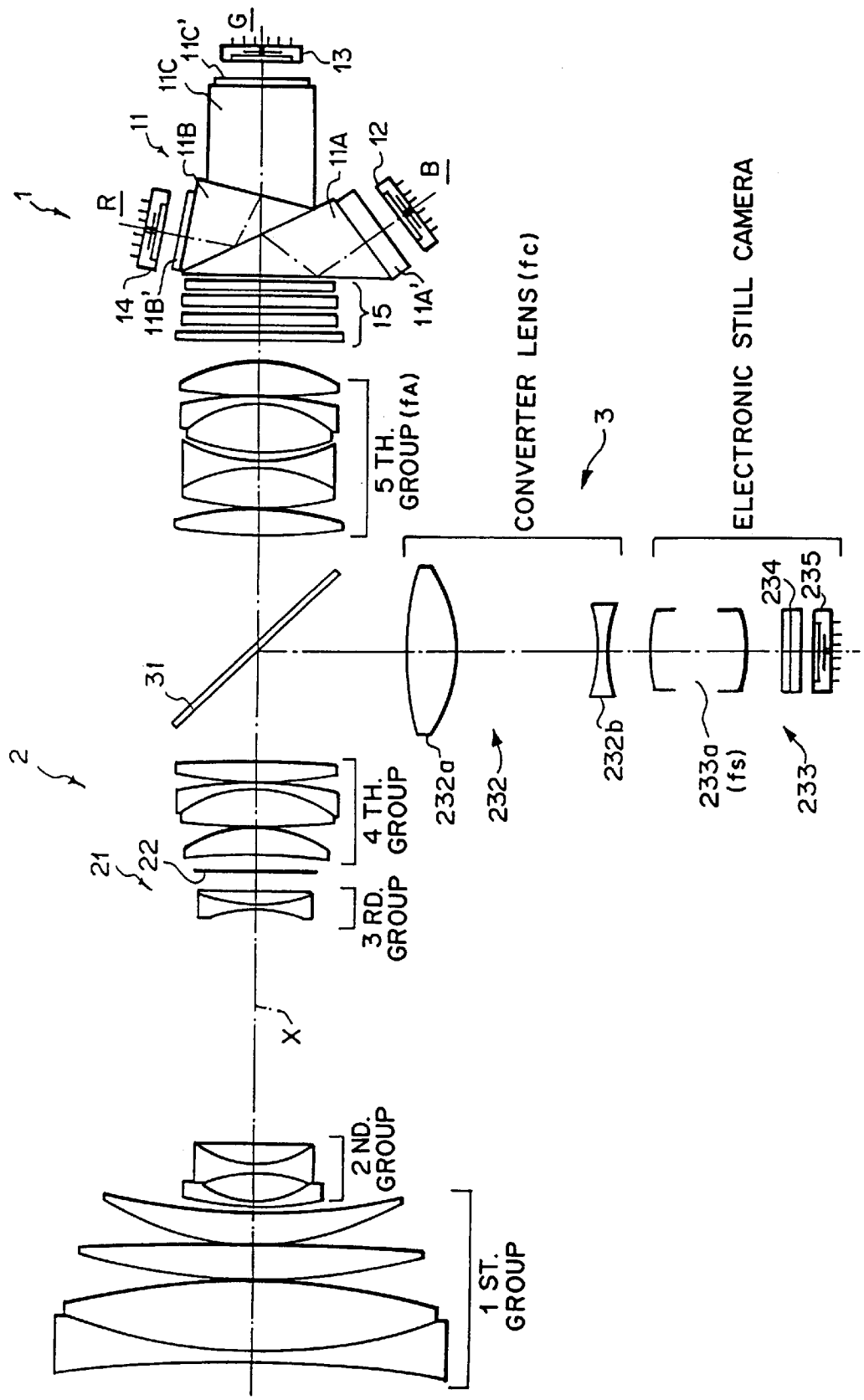

TV LENS WITH STILL-TAKING FUNCTION

RELATED APPLICATIONS

This application claims the priorities of Japanese Patent Application No. 10-21445 filed on Jan. 19, 1998, Japanese Patent Application No. 10-22839 filed on Jan. 20, 1998, Japanese Patent Application No. 10-22840 filed on Jan. 20, 1998, and Japanese Patent Application No. 11-2846 filed on Jan. 8, 1999, which are incorporated herein by reference.

BACKGROUND OF THE INVENTION

1. Field of the Invention

The present invention relates to a TV lens equipped with a still-taking function; and, in particular, to a TV lens, having a still-taking function, attachable to the main body of a broadcasting TV camera mounted with a color-decomposing prism or the like.

2. Description of the Prior Art

In general, a broadcasting TV camera or the like is configured such that, for yielding a color image with a high image quality, a three-color-decomposing prism and CCDs corresponding to the respective color light components for obtaining object information carried by the decomposed individual color light components are mounted in the TV camera main body, whereas various kinds of lenses meeting the aimed purpose, such as zoom lens and macro lens, are made attachable to the front end of the TV camera main body.

In the middle of live TV broadcasting of a sports event or taking a video of a wedding ceremony, there is a demand for electrically recording a highlight scene such as a goal scene or a wedding-cake-cutting scene as a still image by the TV camera (including a video camera, ditto hereinafter) being used.

In order to fulfill such a demand, one frame of the moving picture electrically taken by the TV camera may be used as a still image. When preference is given to the compatibility with current NTSC signals, however, then thus obtained still image would exhibit a lower image quality.

Therefore, it is preferred that a TV lens section or TV camera main body be mounted with a dedicated image-capturing system for still images, such that the still images are obtained with a better image quality by the imaging system separate from the TV-image-capturing system, whereas a part of the TV lens section is commonly used for the still-image-capturing system, so as to make the whole apparatus more compact at a lower cost.

On the other hand, since the TV-image-capturing system is designed such that each kind of aberration becomes favorable in both optical systems of the TV lens section and TV camera in total, when only a part of the TV lens section is commonly used for the still-image-capturing system, then a problem may occur in terms of aberration in the still-image-capturing system, causing a great task to improve.

In order to overcome such a problem, it is an object of the present invention to provide a TV lens additionally equipped with a still-image-capturing function, in which aberration is favorably corrected in optical systems of both of its TV-image-capturing system and still-image-capturing system in a simple and compact configuration.

On the other hand, when a lens section is commonly used for the TV-image-capturing system and the still-image-capturing system, it is necessary for a reflecting mirror or the like to divide a luminous flux or switch advancing directions of the luminous flux. However, it is not always easy to provide a space on the optical axis in which means for dividing the luminous flux or means for switching luminous flux directions, such as a reflecting mirror, can be inserted, while using the existing lens section.

In order to overcome such a problem, it is an object of the present invention to provide a TV lens additionally equipped with a still-image-capturing function, in which a part of an optical system is commonly used for its TV-image-capturing system and still-image-capturing system, and a space for inserting means for dividing a luminous flux or means for switching luminous flux directions used for guiding the incident luminous flux to both of the capturing systems can easily be secured.

Also, in the case where a dedicated electronic still camera for still images is attached to the TV lens section, when a part or all of the TV lens section is used for the still-image-capturing system so that the lens section is commonly used for the still-image-capturing system and TV-image-capturing system, since the electronic still camera has already been equipped with a taking lens, the two image-capturing systems may have composite focal lengths different from each other depending on the focal length of the taking lens of the electronic still camera. As a result, the angle of view may vary on the respective image-capturing devices of the two systems. Since the TV-image-capturing system is usually adjusted such that the picture size of its image-capturing device and the imaging size of the object image coincide with each other, if the respective image-capturing devices of both systems have the same picture size, then there will occur an inconvenience in the still-image-capturing system in that the picture size of the image-capturing device and the imaging size of the object image do not coincide with each other.

Further, when the respective image-capturing devices of the above-mentioned both systems have picture sizes different from each other, then there is a possibility that the disparity between the picture size of the image-capturing device and the imaging size of the object image in the still-image-capturing system may further increase.

In order to overcome such a problem, it is an object of the present invention to provide a TV lens additionally equipped with a still image capturing function, in which the respective angles of view of the optical systems on the image-capturing devices of both of the TV-image-capturing system and the still-image-capturing system can coincide with each other in a simple and compact configuration.

Meanwhile, when capturing a still image, it is necessary that a part of temporally continuous object scenes be cut out with a shutter.

While an electronic shutter for changing the charge storage period of a CCD by altering the bias level or drive clock has been known, when the electronic shutter is employed, then smear may be enhanced by the light irradiated on the light-receiving surface of the CCD in the shutter-off state, whereby the image quality may deteriorate.

Though the occurrence of smear has recently been suppressed due to the development of vertical over-drain and np substrates as compared with the conventional level, further improvement is desired for those requiring a high image quality.

Therefore, it is also an object of the present invention to provide a TV lens equipped with a still-taking function, in which there is no risk of smear being increased by light irradiating the light-receiving surface of the still-image-capturing device during the period in which the electronic shutter is closed.

Also, for example, when an electronic shutter is used in the case where the signal transmission system of the still-image-capturing device is of an interlacing type in conformity with NTSC or the like, then the charge storage periods of first and second fields constituting one frame shift from each other by 1/60 second. As a consequence, in an object moving fast in particular, the first field picture and the second field picture may shift from each other, whereby blurring may occur when a frame image is constructed.

In view of such circumstances, it is also an object of the present invention to provide a TV lens equipped with a still-taking function, which is free from blurring between two field images when the signal transmission system of its still-image capturing device is of an interlacing type.

SUMMARY OF THE INVENTION

The TV lens equipped with a still-taking function in accordance with a first aspect of the present invention is a TV lens having a plurality of lens groups attached to a front end of a TV camera main body mounted with a color-decomposing prism for decomposing, in terms of color, a luminous flux carrying object image information, the TV lens comprising:

a reflecting mirror, disposed at a predetermined inter-lens position in the plurality of lens groups, for guiding the luminous flux carrying object image information into a direction different from the TV camera main body; and a still-image-capturing device, irradiated with the luminous flux guided by the reflecting mirror into the direction different from the TV camera main body, for capturing a still image of the object image;

wherein, between the reflecting mirror and the still-image-capturing device, a still-image lens section formed into the same shape from the same material as a lens section positioned downstream the reflecting mirror, and an optical block for yielding, for a luminous flux incident on the still-image-capturing device, an optical path length substantially equivalent to an optical path length of the luminous flux incident on the color-decomposing prism within the prism are disposed.

The TV lens equipped with a still-taking function in accordance with a second aspect of the present invention is a TV lens having a lens system, attached to a front end of a TV camera main body, including a space adapted to insert a focal length conversion lens group therein, wherein, at an inter-lens position in the lens system in which the focal length conversion lens group is inserted, a reflecting mirror for guiding a luminous flux carrying object image information into a direction different from the TV camera main body is inserted.

Preferably, the reflecting mirror and the focal length conversion lens group are inserted at the inter-lens position so as to be switchable therebetween.

Preferably, the reflecting mirror and the focal length conversion lens group are mounted on a single planar member, and an operation for switching insertion of the reflecting mirror and focal length conversion lens group at the inter-lens position is effected by pivoting or sliding the planar member.

Though the reflecting mirror may be either a half mirror or a total reflection mirror in the TV lens equipped with a still-taking function in accordance with the second aspect of the present invention, the planar member is preferably provided with the total reflection mirror, the focal length conversion lens group, and a through hole section.

The TV lens equipped with a still-taking function in accordance with a third aspect of the present invention is a TV lens having a plurality of lens groups attached to a front end of a TV camera main body mounted with a color-decomposing prism for decomposing, in terms of color, a luminous flux carrying object image information, the TV lens comprising:

a reflecting mirror, disposed at a predetermined inter-lens position where the luminous flux is substantially a parallel luminous flux in the plurality of lens groups, for guiding the luminous flux into a direction different from the TV camera main body; and a converter lens disposed between an electronic still camera and the reflecting mirror, the still camera having a relative position secured with respect to the plurality of lens groups and being adapted to take in the luminous flux guided by the reflecting mirror into the direction different from the TV camera main body so as to capture a still image of the object image, the converter lens being adapted to adjust a focal length of an optical system of a still-image-capturing system such that, according to a difference in focal length between a taking lens of the electronic still camera and a lens disposed downstream the reflecting mirror in the plurality of lens groups and a difference in image-capturing size between an image-capturing device disposed within the TV camera main body and an image-capturing device disposed within the electronic still camera, angles of view in the two image-capturing devices are substantially equivalent to each other.

Preferably, the converter lens is made detachable with respect to a lens mount accommodating the plurality of lens groups.

The TV lens equipped with a still-taking function in accordance with a fourth aspect of the present invention is a TV lens having a plurality of lens groups attached to a front end of a TV camera main body mounted with a color-decomposing prism for decomposing, in terms of color, a luminous flux carrying object image information, the TV lens comprising:

a reflecting mirror, disposed downstream the plurality of lens groups or at a predetermined inter-lens position in the plurality of lens groups, for guiding the luminous flux carrying object image information into a direction different from the TV camera main body; and a still-image-capturing device, irradiated with the luminous flux guided by the reflecting mirror into the direction different from the TV camera main body, for capturing a still image of the object image, wherein a mechanical shutter is inserted in an optical path between the reflecting mirror and the still-image-capturing device so as to cause the shutter to attain an open state only during a charge storage period of the still-image-capturing device.

The still-image-capturing device can employ a signal transmission system of an interlacing type.

Preferably, in this case, the shutter is caused to attain the open state only during a first field charge storage period of the still-image-capturing device.

Though the reflecting mirror may be either a half mirror or a total reflection mirror in the TV lens equipped with a still-taking function in accordance with any of the first, third, and fourth aspects, it is preferred, in the case of the total reflection mirror, that the mirror be movable between a first mirror position for making the luminous flux directly incident on the TV camera main body and a second position for guiding the luminous flux to the still-image-capturing device.

Preferably, the optical block in the TV lens equipped with a still-taking function in accordance with the first aspect is an optical prism having a function for resetting the reflection of the image caused by the reflecting mirror.

BRIEF DESCRIPTION OF THE DRAWINGS

FIG. 14 is a schematic view illustrating in further detail the TV lens system shown in FIG. 7.

DESCRIPTION OF THE PREFERRED EMBODIMENTS

In the following, embodiments of the present invention will be explained with reference to the accompanying drawings.

Figure 1:
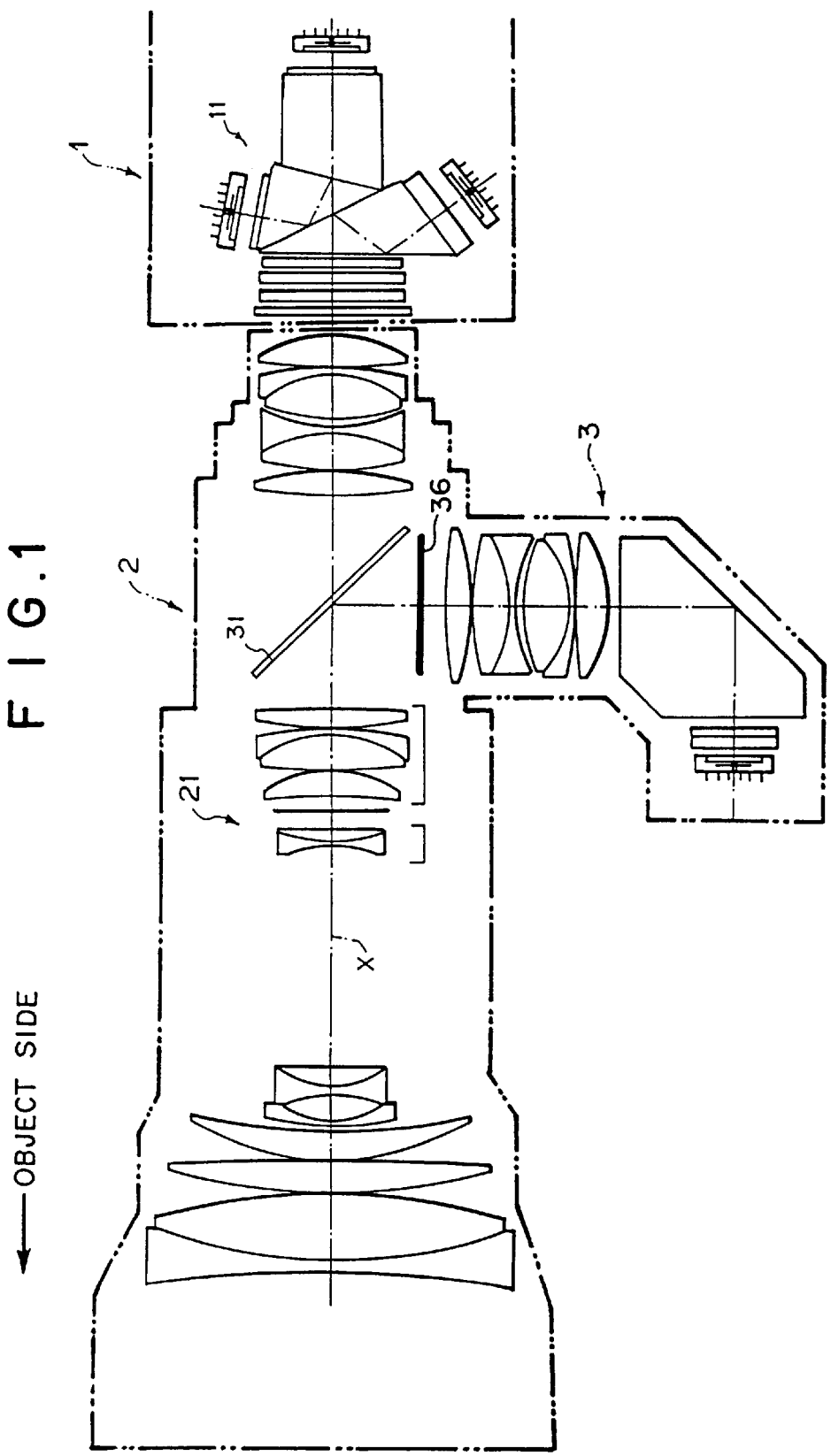
FIG. 1 is a schematic view showing a TV lens equipped with a still-taking function in accordance with a first embodiment of the present invention.

FIG. 1 is a schematic view showing a TV lens equipped with a still-taking function in accordance with a first embodiment of the present invention. This TV lens comprises a TV lens system 2, having zoom lens groups 21, attachable to the object side of a TV camera main body 1 equipped with a color-decomposing prism 11; and a still-image-capturing system 3 for capturing a still image by taking in a luminous flux separated by a half mirror 31 disposed between the zoom lens groups 21.

Figure 2:
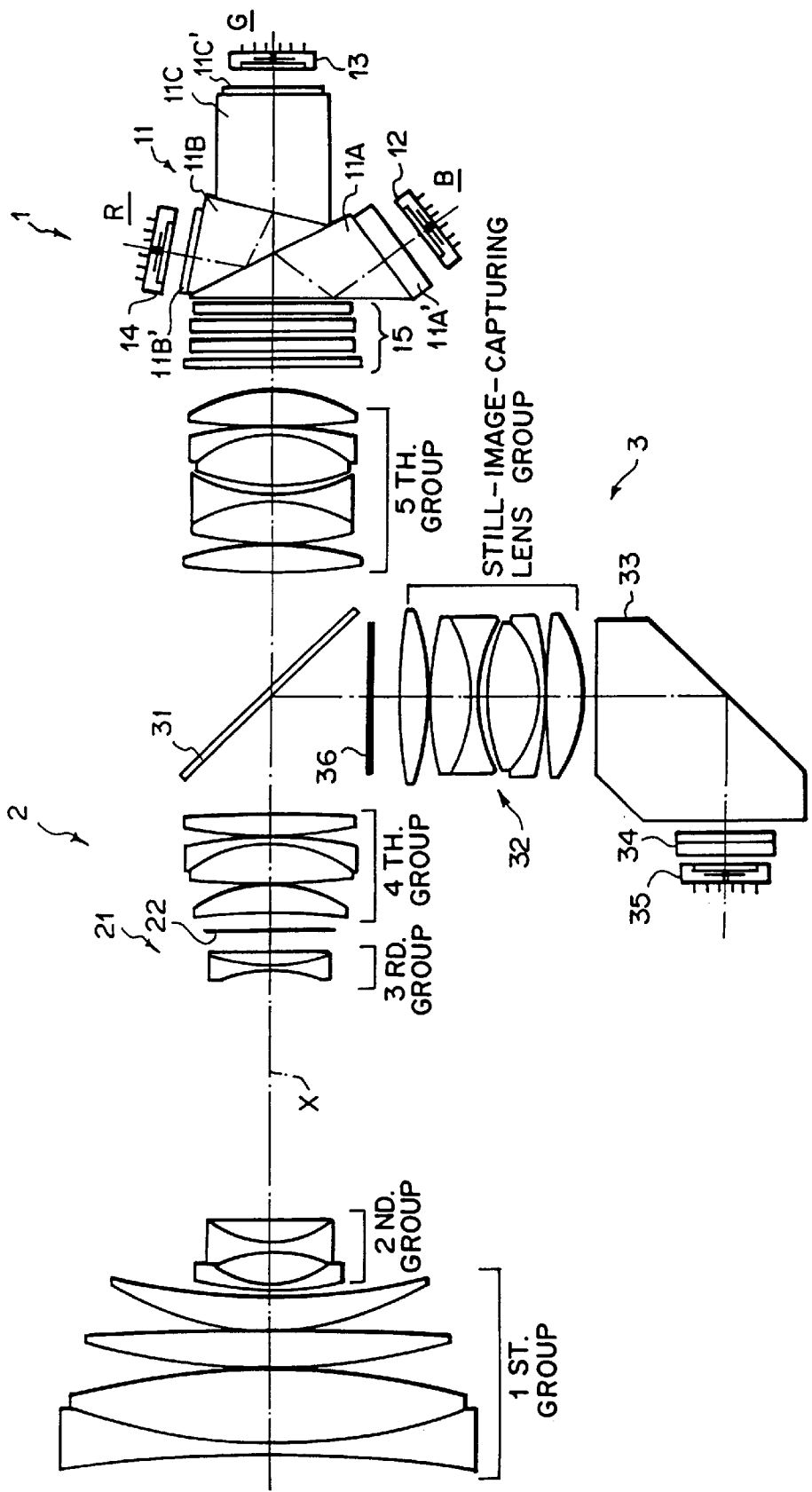
FIG. 2 is a schematic view illustrating in further detail the TV lens shown in FIG. 1.

With reference to FIG. 2, each of the above-mentioned parts will now be explained in detail.

First, the TV camera main body comprises the color-decomposing prism 11 for decomposing a luminous flux carrying object image information into three primary color light components; and image-capturing devices 12, 13, 14 (having an interline structure (IT), for example), on which the respective primary color light components B, G, R decomposed by the color-decomposing prism 11 form images, made of CCDs corresponding to the respective primary color light components.

The color-decomposing prism 11 is made of three prisms 11A, 11B, 11C assembled together. Namely, successively from the TV lens system 2 side along the optical axis X of the TV lens system 2, the first prism 11A, the second prism 11B, and the third prism 11C are disposed. The first prism 11A and the second prism 11B oppose each other with an air gap interposed therebetween. The surface of the first prism 11A opposing the second prism 11B is formed with a first dichroic layer which reflects only the blue light component. The second prism 11B and the third prism 11C are cemented together with a second dichroic layer interposed therebetween, which reflects only the red color light component. As a consequence, the luminous flux incident on the first prism 11A is decomposed by the color-decomposing prism 11 into three primary color components of B, R, G. Trimming filters 11A', 11B', 11C' for adjusting spectroscopic characteristics for B, R, G are attached to the respective exit surfaces of the prisms 11A, 11B, 11C. The color light components irradiate their corresponding image-capturing devices 12, 13, 14 from thereon, whereby the respective object images of color light components are formed on the image-capturing devices 12, 13, 14.

A filter member 15 such as a low-pass filter and/or an infrared cutoff filter is disposed close to the light entrance end face of the first prism 11A.

In the image-capturing devices 12, 13, 14, on which the respective object images of the color light components are formed, the object image information carried by each color light component is photoelectrically converted at a predetermined sampling cycle, and then the resulting electric signals for the individual colors are combined together, so as to form a color TV image of the object.

On the other hand, the TV lens system 2 comprises the zoom lens groups 21 made of five groups.

The zoom lens groups 21 comprise, successively from the object side, a positive first group, made of four lens sheets, having a focusing function; a negative second group, made of three lens sheets, having a power-varying function; a negative third group, made of two lens sheets, for correcting the fluctuation in focal position caused by the power variation; a fourth group made of a positive front relay lens group having four lens sheets; and a fifth group made of a positive rear relay lens group having six lens sheets. At the time of varying power, the second and third groups are moved along the optical axis X while changing the gap between, whereby the focal length f of the whole system is changed, and the luminous flux is efficiently converged onto its imaging position.

In the zoom lens groups 21, a shutter (stop) 22 is disposed between the third and fourth groups.

Here, the fourth and fifth groups are disposed with a large gap therebetween, which is originally intended for a space for inserting a focal length conversion lens group (EXT group) for shifting the focal length of the zoom lens groups 21 to a telephoto side.

In this embodiment, the half mirror 31 is disposed in the space between the fourth and fifth groups, so as to divide the luminous flux incident on the TV lens system 2 into two parts. One of the two parts of the luminous flux is made incident on the TV camera main body 1, whereas the other is guided to the still-image-capturing system 3.

The still-image-capturing system 3 comprises a still-image-capturing lens group 32, a rectangular prism 33 for re-reflecting the object image reflected by the half mirror 31 so as to reset the image posture, a filter member 34 such as a low-pass filter and/or an infrared cutoff filter, and a still-image-capturing device 35 made of a CCD. A still-image-capturing mechanical shutter 36 is disposed between the half mirror 31 and the still-image-capturing lens group 32.

Here, the zoom lens groups 21 of the TV lens system 2 and the optical system in the TV camera main body 1 such as the color-decomposing prism 11 are designed such that they reduce aberration in total, and are configured such that the image formed on the image-capturing device 35 has a favorable image quality.

As a consequence, when the luminous flux is divided by the half mirror 31 so as to be taken into the still-image-capturing system 3, then aberration may become unfavorable per se, thus making it difficult for the image formed on the image-capturing device 35 to attain a favorable image quality.

Therefore, in this embodiment, the still-image-capturing system 3 includes therein the still-image-capturing lens group 32, having totally the same configuration (the same number of lens sheets, lens form, and lens material) as that of the fifth group, disposed downstream the half mirror 31; and the rectangular prism 33, disposed downstream thereof, for providing the luminous flux with an optical path length substantially identical to the optical path length within the color-decomposing prism 11 when the luminous flux passes through the color-decomposing prism 11, so that aberration is favorably corrected in the case where a still image is captured by the still-image-capturing system 3 as with the case where a TV image is captured by the TV-image-capturing system, thus allowing reproduced images to be obtained with a high image quality.

Namely, the first, second, third, fourth, and fifth groups and the color-decomposing prism 11 constituting the optical system for the TV-image-capturing system become equivalent to the first, second, third, and fourth groups, the still-image-capturing lens group 32, and the rectangular prism 33 constituting the still-image-capturing system in terms of optical characteristics, whereby the aberration on the image-capturing devices 12, 13, 14 in the TV-image-capturing system and the aberration on the image-capturing device 35 in the still-image-capturing system 3 become similar to each other.

Here, if the optical characteristics of the filter member 15 in the TV-image-capturing system 3 and those of the filter member 34 in the still-image-capturing system 3 are designed to be identical to each other, the respective aberrations in both systems can be made to strictly coincide with each other.

Also, since the fifth group in the zoom lens groups 21 and the still-image-capturing lens group 32 are configured totally identical to each other in terms of their number of lens sheets, lens form, and lens material as mentioned above, a lens manufacturing process can be used in common, whereby their manufacturing steps can be reduced, and their manufacturing cost can be cut down.

Further, since the luminous flux is reflected by the rectangular prism 33 in the still-image-capturing system 3, the image reflected by the half mirror 31 can vertically be inverted again, whereby the image posture on each of the image-capturing devices 12, 13, 14 of the TV-image-capturing system and the image posture on the image-capturing device 35 of the still-image-capturing system 3 can be made to coincide with each other.

Without being restricted to the above-mentioned embodiment, the TV lens equipped with a still-taking function in accordance with the present invention can be modified in various manners. For example, the positions where the rectangular prism 33 and the filter member 34 are disposed are interchangeable.

The lens group constituting the TV lens group 2 is not restricted to the zoom lens group but may be of a fixed focus type. Also, its function and lens configuration should not be restricted, as long as there is a space for inserting a reflecting mirror for introducing a luminous flux into the still-image-capturing system 3.

Also the inter-group position for inserting the reflecting mirror in the lens groups should not be limited.

Figure 5:
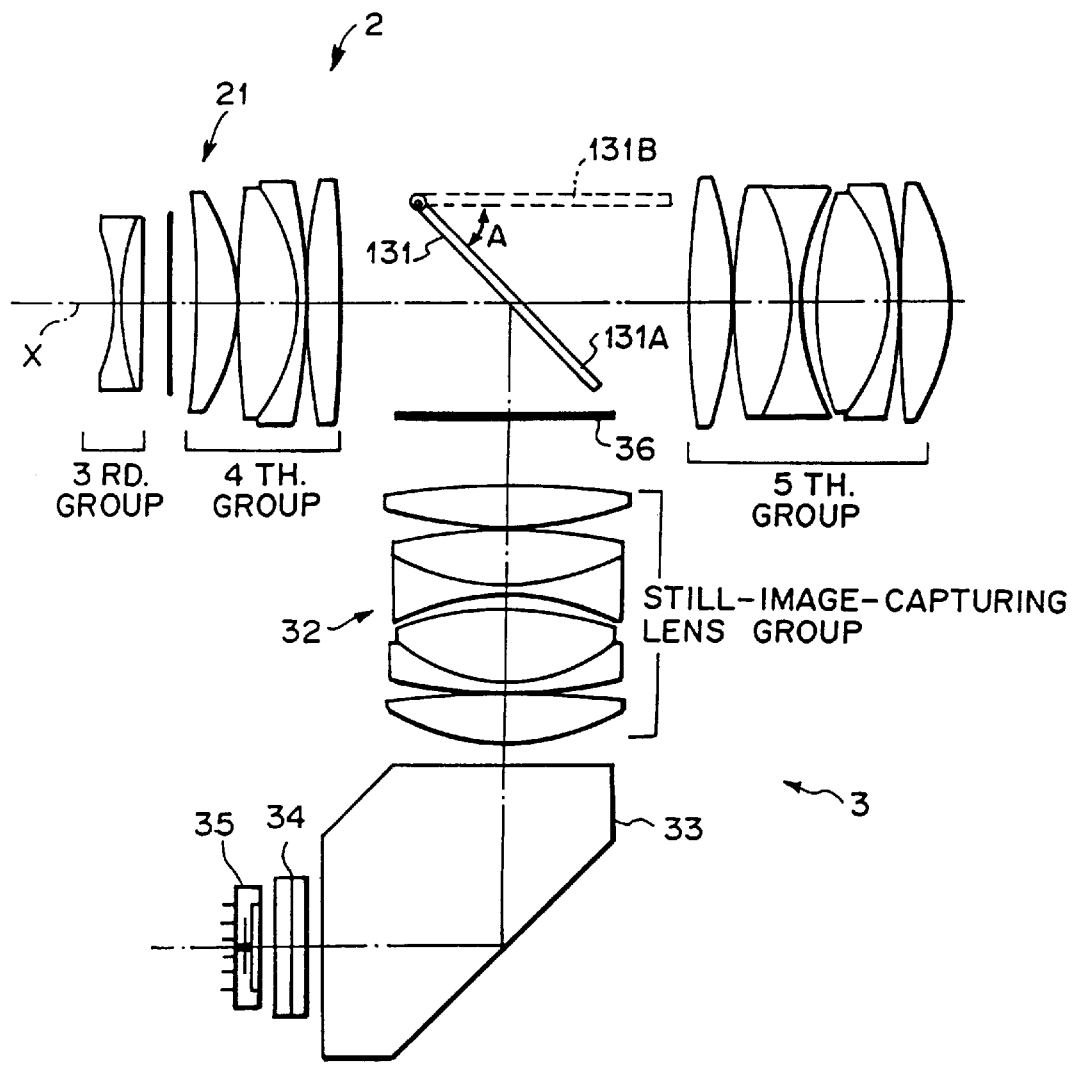
FIG. 5 is a schematic view showing an embodiment in which the TV lens shown in FIG. 1 is partly modified.

Without being restricted to the above-mentioned planar half mirror, the reflecting mirror may be a half prism shaped like a glass block, or a total reflection mirror instead of the half mirror as well. When a total reflection mirror is employed as the reflecting mirror, as shown in FIG. 5, it is necessary for this total reflection mirror 131 to be made movable between two positions consisting of a position 131A on the optical path X and a position 131B outside the optical path X. As a consequence, the whole luminous flux is guided to the still-image-capturing system 3 when the total reflection mirror 131 is disposed at the position 131A on the optical path X, whereas the whole luminous flux is guided to the TV-image-capturing system when the total reflection mirror 131 is disposed at the position 131B outside the optical path X.

The movement in this case may be effected, for example, as the total reflection mirror 131 is pivoted by a predetermined angle in the arrowed directions A about one end thereof as shown in FIG. 5. In the case where the total reflection mirror 131 is inserted into the space for inserting the EXT group in the above-mentioned embodiment, the operation for moving the total reflection mirror 131 to the position 131B outside the optical path X and the operation for inserting the EXT group into the space may be synchronized with each other.

Figure 6:
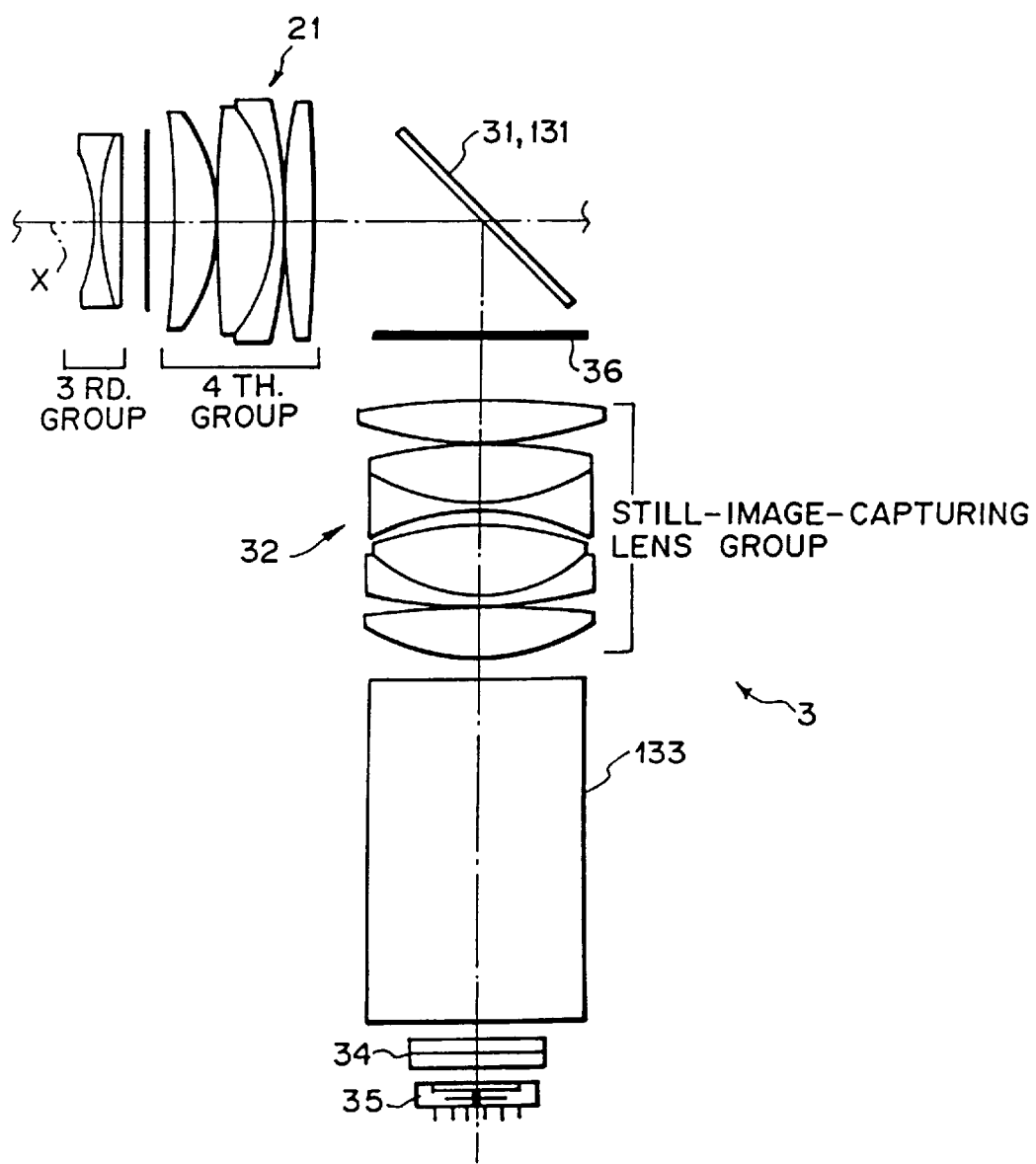
FIG. 6 is a schematic view showing an embodiment in which the TV lens shown in FIG. 1 is partly modified.

Though the rectangular prism 33 functions to vertically invert the image posture by reflecting the luminous flux; if the luminous flux is desired to form an image on the image-capturing device 35 with its posture inverted by the reflecting mirror 31, 131 in the TV lens system 2 or if the image information captured by the image-capturing device 35 is to be electrically inverted, then a glass block 133, such as that shown in FIG. 6, for providing the luminous flux passing therethrough with the same optical path length as that in the rectangular prism 33 may be disposed, such that the luminous flux directly advances to pass through the glass block 133.

Figure 3:
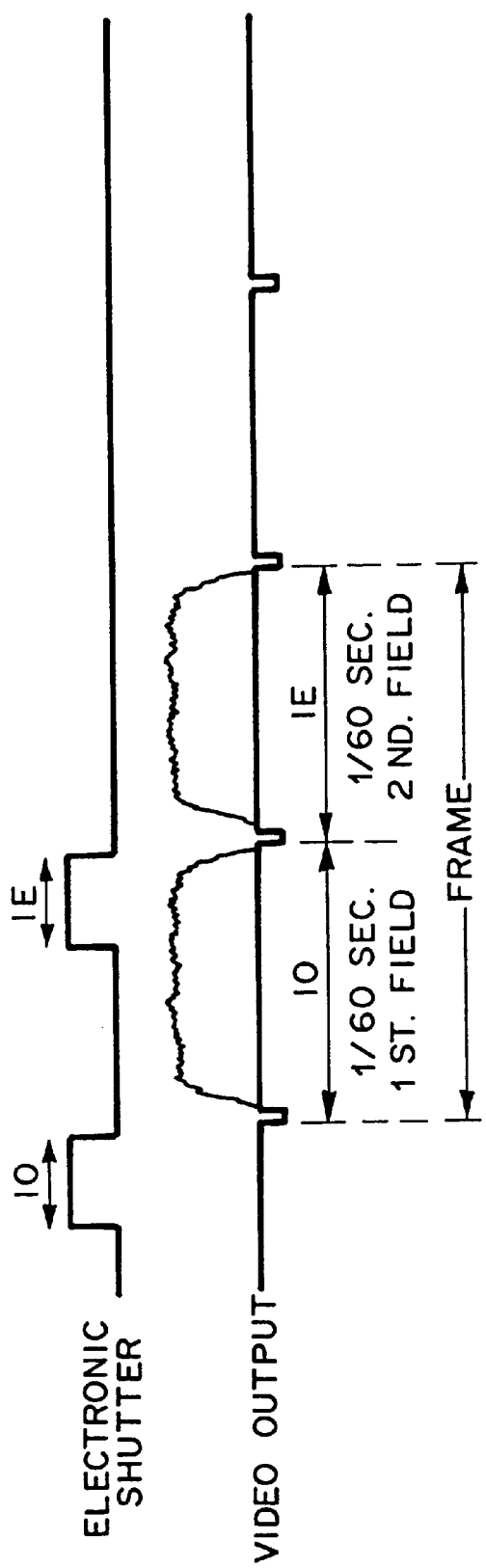
FIG. 3 is a time chart showing a relationship between charge storage periods and video signal outputting periods in the case where charges are stored in a CCD image-capturing device using an electronic shutter alone.

Meanwhile, the CCD image-capturing device 35 as the still-image-capturing device employs, as its signal transmission system, an interlacing system (30 frames/sec, 60 fields/sec) in conformity with NTSC, whereby the video signal output from the device 35 yields such a form as that shown in FIG. 3, which is divided into a first field IO and a second field IE.

Each of the first field IO and second field IE constituting one frame of a still image has a period of $\frac{1}{60}$ second.

In general, the CCD image-capturing device 35 has a function known as electronic shutter which can restrict the charge storage period corresponding to each of the above-mentioned fields to a predetermined period shorter than the signal output period of one field ($\frac{1}{60}$ second).

Though the shutter open period of the electronic shutter may vary depending on the structure of the CCD image-capturing device 35, the above-mentioned interline structure (IT) can realize a variable-speed shutter within the range of about 1/60 to 1/2000 second.

FIG. 3 schematically shows this electronic shutter open period, and the respective letters noted above its H level periods refer to charge storage periods for obtaining images of the field periods corresponding to the letters.

In the case using such an electronic shutter, however, the respective charge storage periods of the first field (IO) and second field (IE) deviate from each other by 1/60 second, whereby the video signals for the first field (IO) and the second field temporally shift from each other. As a consequence, if these video signals are reproduced to constitute one sheet of frame image, blurring will occur in the image.

Figure 4:
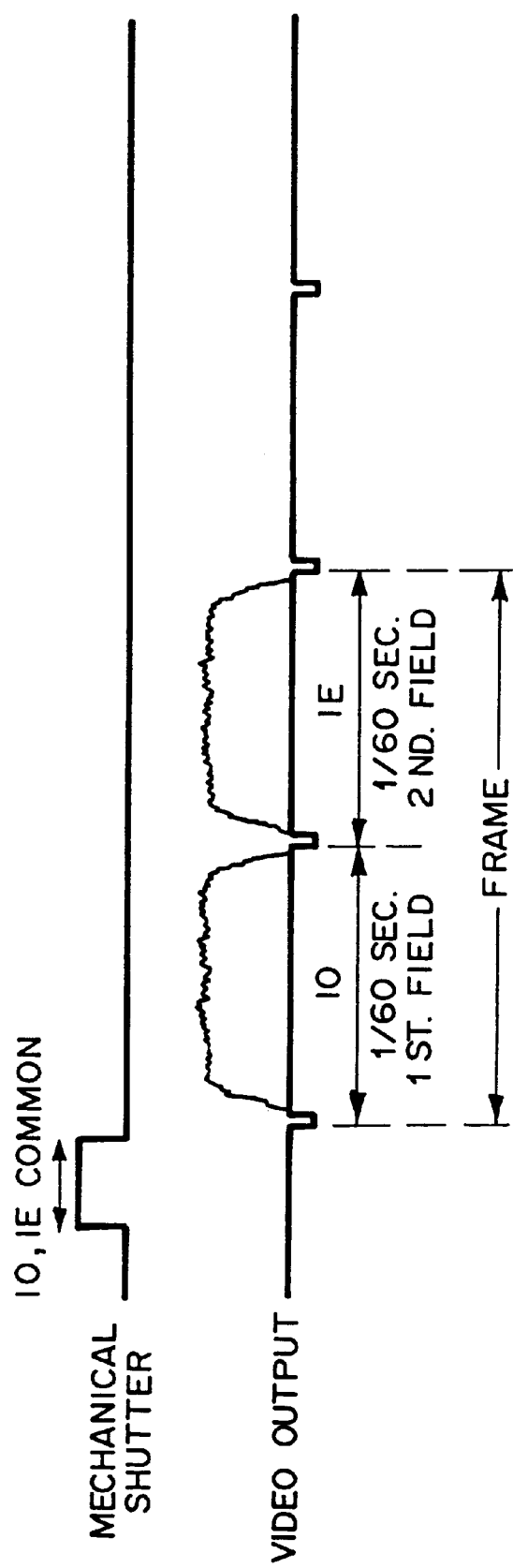
FIG. 4 is a time chart showing a relationship between charge storage periods and a video signal outputting periods in the case where charges are stored in a CCD image-capturing device using a mechanical shutter.

Therefore, in this embodiment, as shown in FIG. 2, the mechanical shutter 36 is disposed between the half mirror 31 and the still-image-capturing lens group 32, such that, as shown in FIG. 4, the shutter attains an open state only during one charge storage period in response to the image readout operation for one frame, and the image signal being read out whose charges are stored in this charge storage period is used for both the first field (IO) and second field (IE).

As a consequence, the respective charge storage periods of both fields have temporally the same timing, so that their respective video signals temporally coincide with each other, whereby no image blurring will occur if these video signals are reproduced to constitute one sheet of frame image.

Here, it is not always necessary for the video signals to be read out immediately after the open state period of the mechanical shutter 36 is terminated. Namely, the video signals may be read out after the lapse of a desired period from the storing of charges in the state where the mechanical shutter 36 is open. In this case, it is necessary that the mechanical shutter 36 be kept in a closed state until the video signal readout period is terminated after the storing of charges.

Regardless of whether the CCD image-capturing device 35 employs an interlacing system or not, in the case where an electronic shutter is used, a phenomenon known as smear is generated by light irradiating the light-receiving surface even in its shutter-off period, whereby the quality of reproduced image may deteriorate. In the configuration where the mechanical shutter 36 is used for inhibiting the light-receiving surface of the CCD image-capturing device 35 from being irradiated with light in the shutter-off period, by contrast, smear would not increase, whereby a reproduced image with less image quality deterioration can be obtained.

Here, smear refers to a phenomenon in which, when particularly strong light is incident on the light-receiving surface of a solid-state image-capturing device, a pseudo signal shaped like a bright band occurs above and below the part of a picture corresponding to the portion where the light is incident. This phenomenon occurs since the signal charge generated upon the incidence of light may intrude into other pixels or transmission lines due to diffusion or since the incident light is scattered within the device.

Without being restricted to the above-mentioned embodiment, the TV lens equipped with a still-taking function in accordance with the present invention can be modified in various manners. For example, though the above-mentioned embodiment employs the CCD image-capturing device 35 in conformity with NTSC for capturing still images, the signal transmission system of the CCD image-capturing device 35 is not limited thereto, of course. For example, not only PAL system or SECAM system but also non-interlacing systems can be employed.

Further, though a single-sheet CCD image-capturing device is used in the above-mentioned embodiment, a single-sheet MOS image-capturing device can be used instead. Also, a three-sheet type can be used in place of the single-sheet type.

The mechanical shutter 36 may be disposed at any position between the half mirror 31 and the image-capturing device 35, without being limited to the space between the half mirror 31 and the still-image-capturing lens group 32. For example, it may be disposed between the still-image-capturing lens group 32 and the rectangular prism 33, between the rectangular prism 33 and the filter member 34, or between the filter member 34 and the image-capturing device 35.

Also, the TV lens system 2 and the still-image-capturing system 3 are interchangeable.

Though the reflecting mirror is disposed in an inter-lens space of the TV lens in the above-mentioned embodiment, the TV lens equipped with a still-taking function in accordance with the present invention is also applicable to the case where the reflecting mirror is disposed downstream the TV lens.

Figure 7:
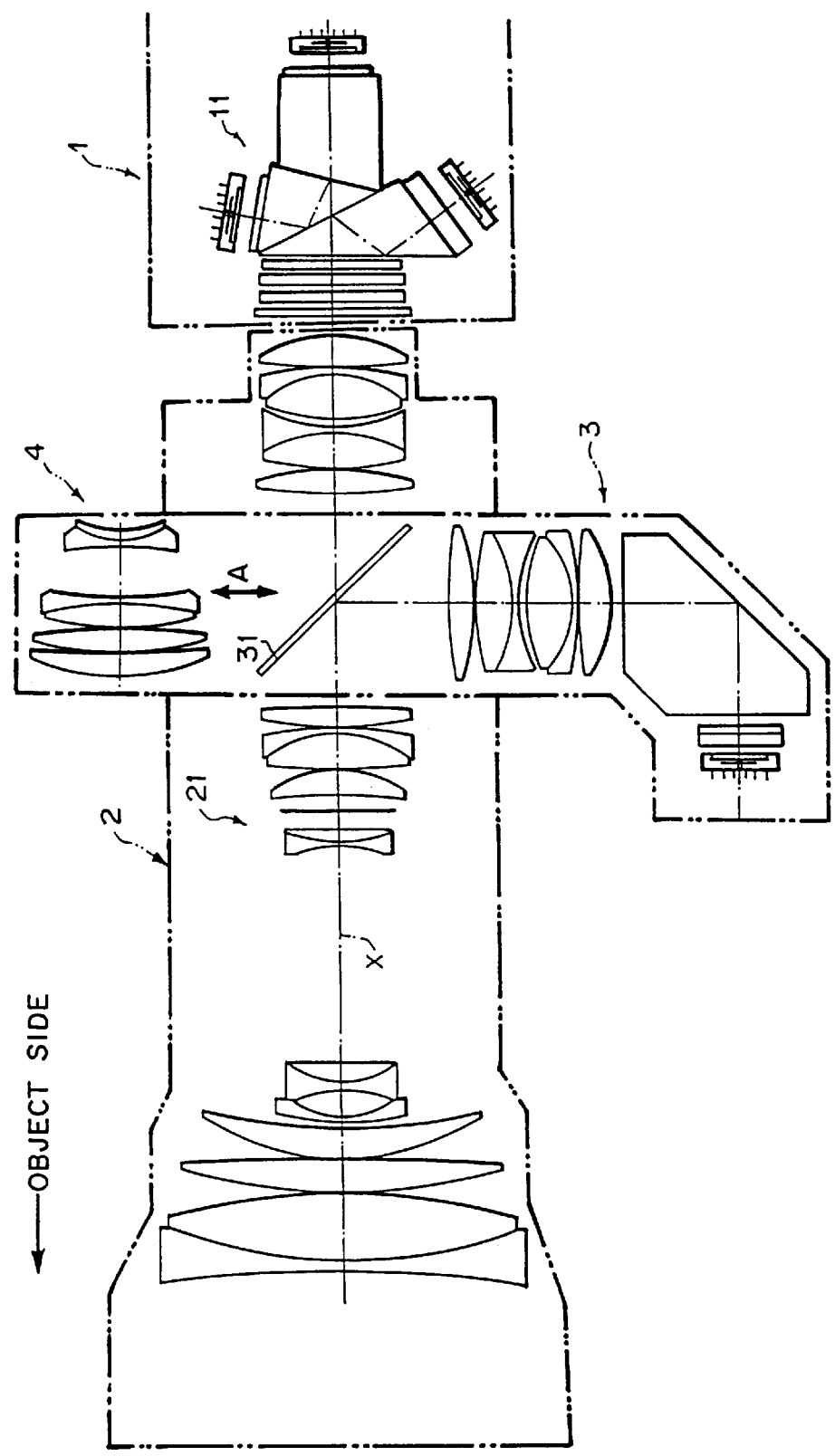
FIG. 7 is a schematic view showing a TV lens equipped with a still-taking function in accordance with a second embodiment of the present invention.

FIG. 7 is a schematic view showing a TV lens equipped with a still-taking function in accordance with a second embodiment of the present invention. This TV lens comprises a TV lens system 2, having zoom lens groups 21, attachable to the object side of a TV camera main body 1 equipped with a color-decomposing prism 11; a still-image-capturing system 3 for capturing a still image by taking in a luminous flux reflected by a total reflection mirror 31 retractably disposed between the zoom lens groups 21; and a focal length conversion lens group (hereinafter referred to as EXT group) 4.

Here, the total reflection mirror 31 and the EXT group 4 are configured such as to be disposed on the optical axis X of the zoom lens group 21 exclusively from each other.

Figure 8:
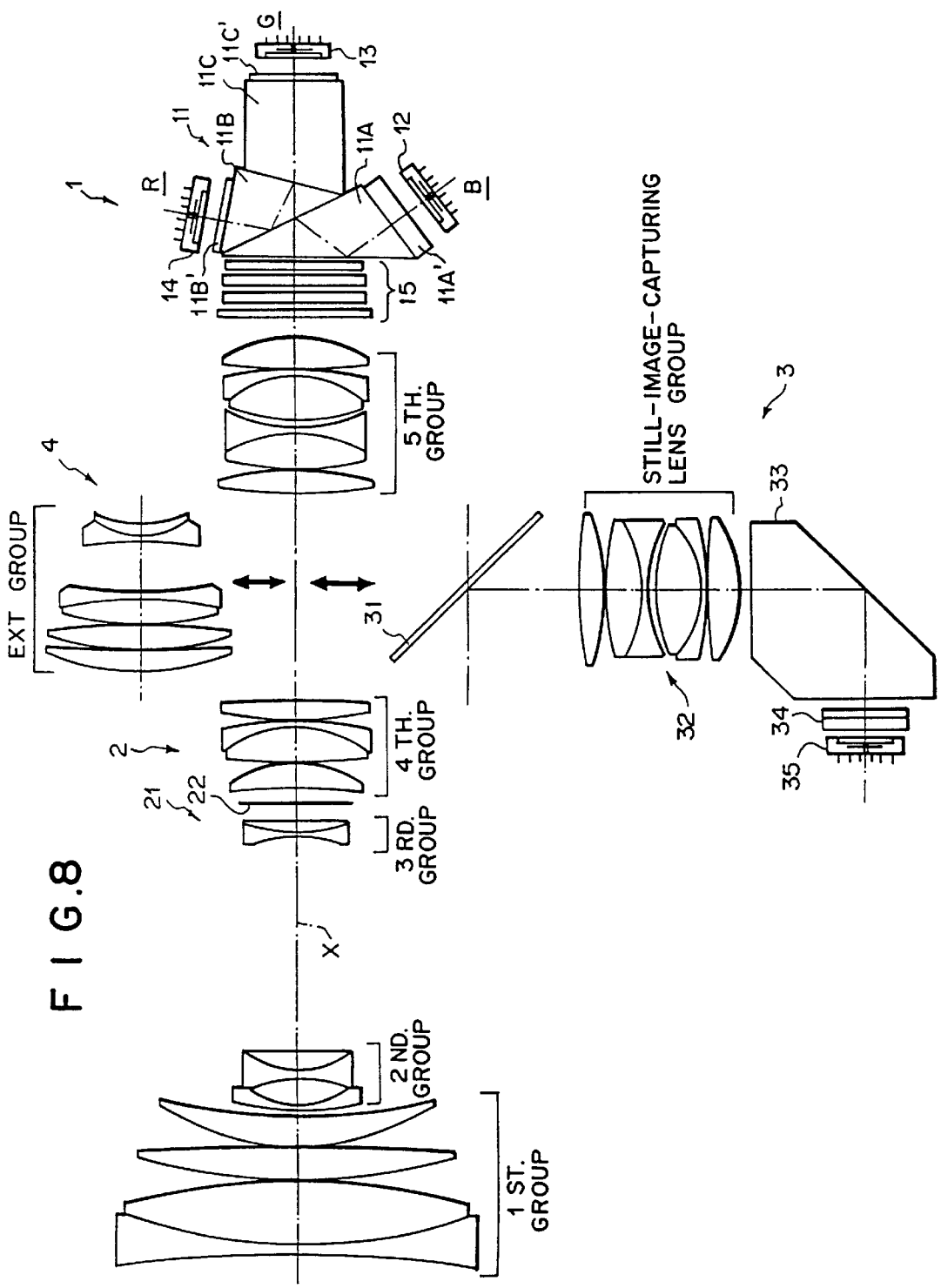
FIG. 8 is a schematic view illustrating in further detail the TV lens shown in FIG. 7.

With reference to FIG. 8, each of the above-mentioned parts will now be explained. Here, the parts identical to those in the above-mentioned first embodiment will be referred to with numerals identical thereto, without repeating their explanations.

In this embodiment, the total reflection mirror 31 can be inserted into the space adapted to insert the EXT group 4 between the fourth and fifth groups, so as to be switchable from/to the EXT group 4.

Figure 9:
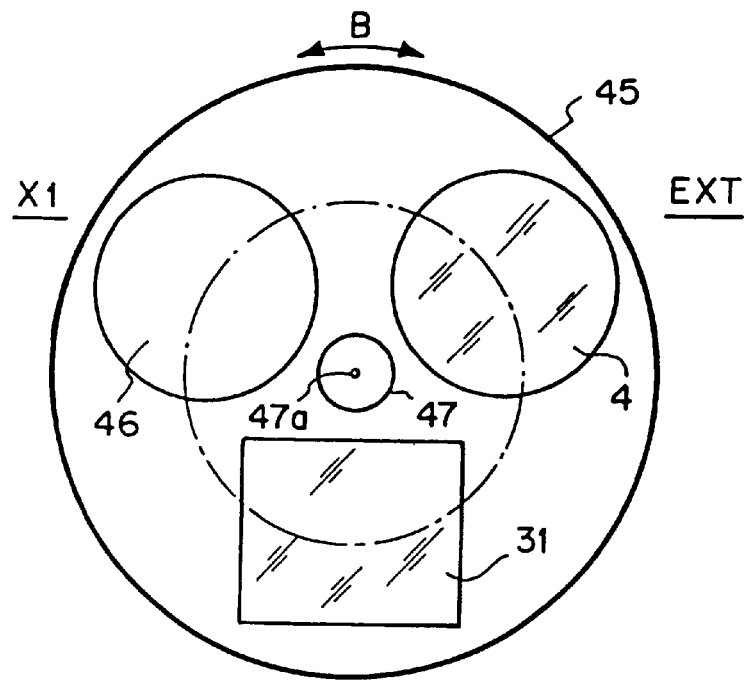
FIG. 9 is a schematic view showing a turret plate used in the embodiment shown in FIG. 7.

Namely, the EXT group 4 and the total reflection mirror 31 are disposed on a turret plate 45 such as that shown in FIG. 9, whereas the turret plate 45 is rotatable in the arrowed directions B about the center 47a of its rotary shaft 47. The turret plate 45 is also formed with a through-hole portion 46. The respective positions of the through-hole portion 46, EXT group 4, and total reflection mirror 31 are arranged such as to be equiangular to each other and separated by the same distance d from the center of rotation on the turret plate 45.

The rotary shaft 47 of the turret plate 45 is located at a position deviated from the optical axis X of the zoom lens groups 21 by the distance d, whereby the through-hole portion 46, the EXT group 4, and the total reflection mirror 31 are selectively disposed on the optical axis X as the rotary shaft 47 rotates, while the turret plate 45 is held there.

Figure 10:
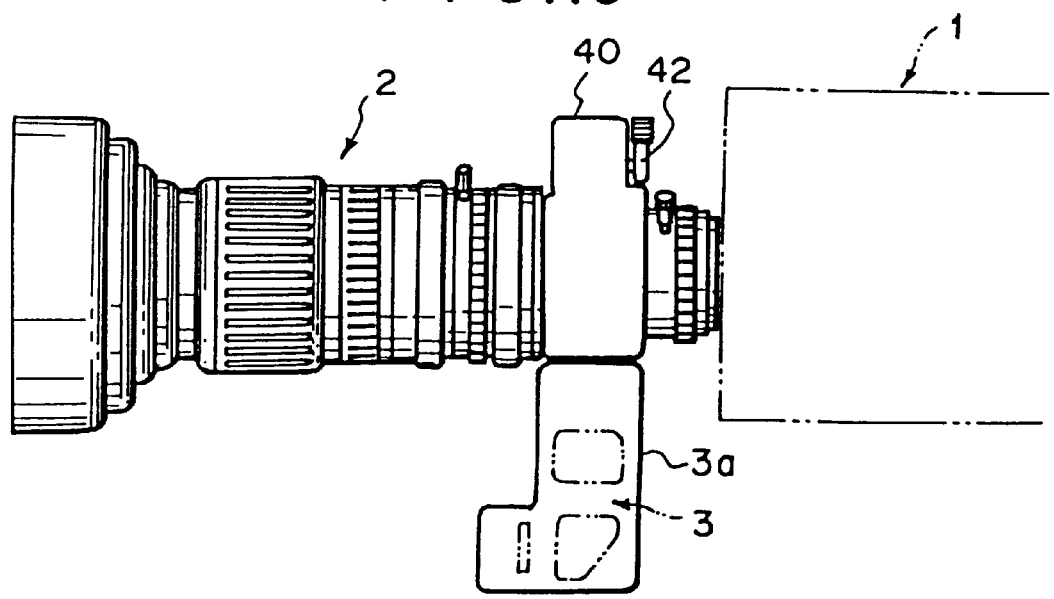
FIG. 10 is a schematic view showing the form of a side portion in the exterior surface of the embodiment shown in FIG. 7.

The turret plate 45 is covered with a cover member 40 such as that shown in FIG. 10 and is rotatable as a turret plate operating lever 42 disposed outside the cover member 40 is operated. The turret plate 45 is operated such that the through-hole portion 46, the EXT group 4, and the total reflection mirror 31 are positioned on the optical axis X of the zoom lens groups 21 when a normal power is sufficient as the zoom power for capturing a TV image, when a high power is required therefor, and when a still image is to be captured, respectively.

Figure 11:
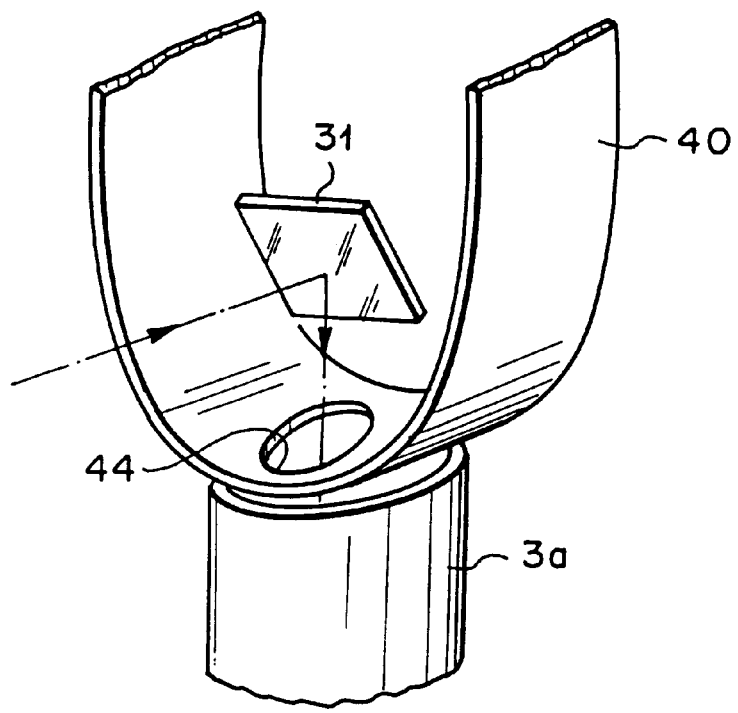
FIG. 11 is a partly fragmentary view showing an operation of the embodiment shown in FIG. 7.

The lower part of the cover member 40 is provided with a through-hole portion 44 as shown in FIG. 11, such that, when the turret plate 45 is rotated so as to position the total reflection mirror 31 on the optical axis X of the zoom lens groups 21; then the luminous flux carrying object image information is reflected by the total reflection mirror 31 (tilted with respect to the luminous flux by 45°) so as to pass through the through-hole portion 44 and enter the lens mount 3a of the still-image-capturing system 3 disposed near the lower part of the cover member 40.

The still-image capturing system 3 comprises a still-image-capturing lens group 32, a rectangular prism 33 for re-reflecting the object image reflected by the total reflection mirror 31 so as to reset the image posture, a filter member 34 such as a low-pass filter and/or an infrared cutoff filter, and a still-image-capturing device 35 made of a CCD.

Figure 12:
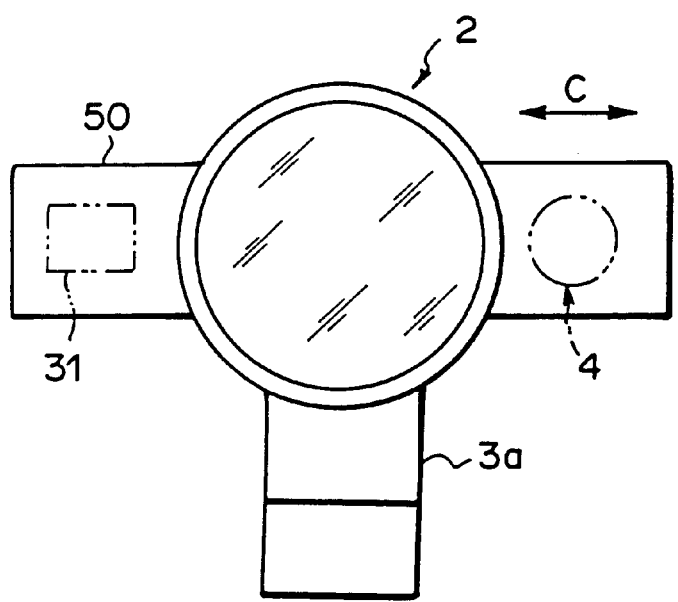
FIG. 12 is a schematic front view showing an embodiment different from that shown in FIG. 7.

Without being restricted to the above-mentioned embodiment, the TV lens equipped with a still-taking function in accordance with the present invention can be modified in various manners. For example, in place of the turret plate 45, a slide plate 50 such as that shown in FIG. 12, which is slidable in the arrowed directions C, may be disposed at the above-mentioned space adapted to insert the EXT group.

Though the through-hole portion 46 (not illustrated in FIG. 12) is disposed at a position on the optical axis X of the TV lens system 2 in the depicted state, the slide plate 50 may be slid in the arrowed directions C from this state, so as to place the EXT group 4 or total reflection mirror 31 at the position on the optical axis X.

When the total reflection mirror 31 is disposed at the position on the optical axis X, then the luminous flux incident on the TV lens system 2 can be guided into the lens mount 3a of the still-image-capturing system 3 located below the slide plate 50, as in the above-mentioned case using the turret plate 45.

As with the case using the turret plate 45, the whole slide plate 50 may be covered with a cover member having an appropriate form.

The positions where the rectangular prism 33 and the filter member 34 are disposed are interchangeable.

A half mirror may be used in place of the total reflection mirror. When the half mirror is used as the reflecting mirror, it is not always necessary to provide the through-hole portion 46 shown in FIG. 9.

Figure 13:
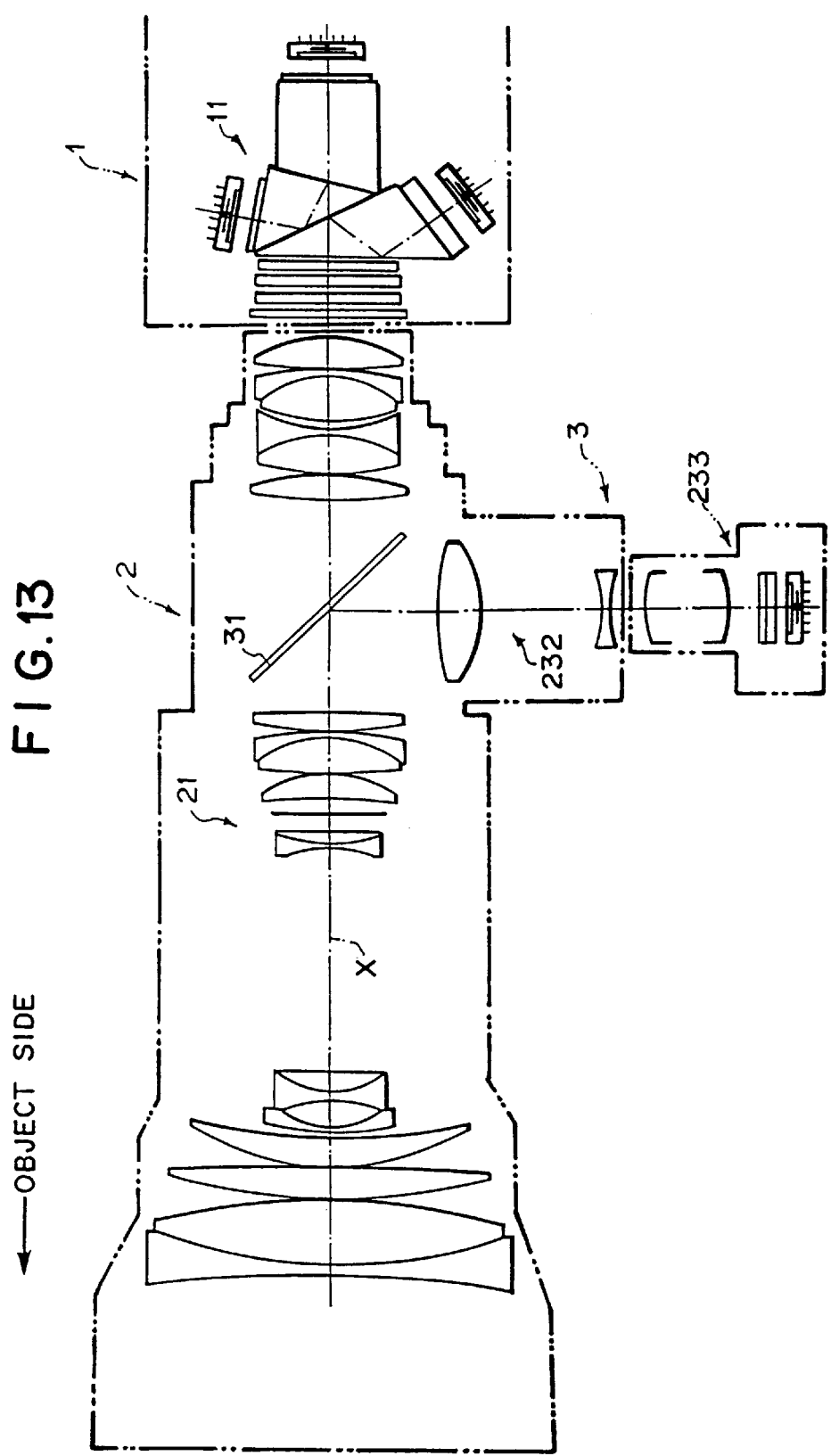
FIG. 13 is a schematic view showing a TV lens equipped with a still-taking function in accordance with a third embodiment of the present invention.

FIG. 13 is a schematic view showing a TV lens equipped with a still-taking function in accordance with a third embodiment of the present invention. In this embodiment, parts having functions in common with those in the foregoing embodiments are referred to with numerals identical thereto, without repeating their explanations. This TV lens comprises a TV lens system 2, having zoom lens groups 21, attachable to the object side of a TV camera main body 1 equipped with a color-decomposing prism 11; and a still-image-capturing system 3 for capturing a still image by taking in a luminous flux separated by a half mirror 31 disposed between the zoom lens groups 21. A dedicated electronic still camera 233 for taking still images is detachably attached to the lower end portion of the lens mount of the still-image-capturing system 3.

With reference to FIG. 14, each of the parts peculiar to this embodiment will now be explained.

In this embodiment, the half mirror 31 is disposed in the space between the fourth and fifth groups, so as to divide the luminous flux incident on the TV lens system 2 into two parts. One of the two parts of the luminous flux is made incident on the TV camera main body 1, whereas the other is guided to the still-image-capturing system 3.

The still-image-capturing system 3 comprises a converter lens 232 having a two-group configuration (illustrated as a configuration made of two sheets of single lenses in FIG. 14) made of a convex lens group 232a and a concave lens group 232b, whereas the electronic still camera 233 is adapted to attach to the converter lens 232 with their optical axes coinciding with each other.

Meanwhile, the zoom lens groups 21 of the TV lens system 2 are adjusted such that the angle of view becomes appropriate on each of the image-capturing devices 12, 13, 14 for the respective colors disposed downstream the colorde-composing prism 11 in the TV camera main body 1, and are designed such that the picture size of each of the image-capturing devices 12, 13, 14 and the imaging size of the object image precisely coincide with each other. Hence, the object image is kept from sticking out of the reproduced picture or being displayed in a reduced state.

In the case where the luminous flux is divided by the half mirror 31 so as to be outputted to each of the TV-image-capturing system and the still-image-capturing system 3, however, though the optical systems of both systems are in common with each other in the part (first, second, third, and fourth groups) upstream the half mirror 31, they differ from each other in the part downstream the half mirror 31. Namely, while the TV-image-capturing system has a fifth group, the still-image-capturing system 3 includes a taking lens 233a of the electronic still camera 233. Since the fifth group and the taking lens 233a of the electronic still camera 233 have different focal lengths f in general, the respective systems have different angles of view, whereby there is a possibility that the object image may be formed at a part of the picture of the image-capturing device 235 of the electronic still camera 233, and a reduced object image may be formed at a part of the reproduced picture.

Therefore, in this embodiment, the converter lens 232 for compensating for the difference in focal length between the fifth group and the taking lens 233a of the electronic still camera 233 is disposed downstream the half mirror 31 in the still-image-capturing system 3. In this embodiment, each of the image-capturing devices 12, 13, 14 has a picture size of (⅔)", and the image-capturing device 235 of the electronic still camera 233 to be attached to the still-image-capturing system 3 is also (⅔)". Hence, the converter lens 232 for making the composite focal length $f_{BC}$ of the taking lens 233a (focal length $f_B$) of the electronic still camera 233 and the converter lens 232 (focal length $f_C$) equal the focal length $f_A$ of the fifth group is disposed so as to make the angle of views of both systems coincide with each other. In other words, letting the converter magnification of the converter lens 232 be $M_C$, the converter lens 232 satisfying the expression of $f_A = M_C \cdot f_B$ is disposed.

Specifically, for example, letting the focal length $f_A$ of the fifth group be 50 mm, and the focal length $f_B$ of the taking lens 233a of the electronic still camera 233 be 20 mm, the angles of view of the TV-image-capturing system and the still-image-capturing system 3 can be made to equal each other if the magnification $M_C$ of the converter lens 232 is set to 2.5×.

In the case where the image-capturing devices 12, 13, 14, 235 of both systems have picture sizes different from each other, then the converter magnification $M_C$ of the converter lens 232 is set while taking account of the difference in their picture sizes as well.

For example, letting the picture size of each of the image-capturing devices 12, 13, 14 in the TV-image-capturing system be (⅔)", the picture size of the image-capturing device 235 of the electronic still camera 233 be (⅓)", the focal length $f_A$ of the fifth group be 50 mm, and the focal length $f_B$ of the taking lens 233a of the electronic still camera 233 be 11 mm, the angles of view of the TV-image-capturing system and the still-image-capturing system 3 can be made to equal each other if the magnification $M_C$ of the converter lens 232 is set to 2.5×. (Since the diagonal size of the (⅔)"-size picture is 11 mm, whereas that of the (⅓)"-size is 6 mm, $M_C = (f_A/f_B) \times (6/11)$.)

Also, since the converter magnification MC of the converter lens 232 should be set according to the focal length of the taking lens 233a of the electronic still camera 233 and the picture size of the image-capturing device 235, it is preferred that the converter lens 232 be accommodated in a ring-shaped lens mount such as to be replaceable together with the electronic still camera 233, the ring-shaped lens mount being made detachable with respect to the lens mount of the TV lens system 2.

Preferably, the holder section of the electronic still camera 233a has a holder structure which is securely held at the lower end portion of the lens mount of the still-image-capturing system 3 while being easily detachable with respect thereto.

Also, a filter member 234 such as a low-pass filter and/or an infrared cutoff filter is disposed upstream the still-image-capturing device 235 in the electronic still camera 233.

Various modes of modification are possible in this embodiment as well. For example, the lens configuration of the converter lens 232 can appropriately be changed.

As explained in the foregoing, since a reflecting mirror is inserted in the inter-lens space of the TV lens attached to the TV camera main body, and the luminous flux deflected by the reflecting mirror is made incident on the still-image-capturing device, the TV lens equipped with a still-taking function in accordance with the first aspect of the present invention is convenient in that a single TV camera apparatus can take both the TV and still images.

Also, since the lens sections in the TV-image-capturing system and still-image-capturing system are partly used in common, the apparatus as a whole can be made compact and cut down its cost. On the other hand, since the image-capturing device of the still-image-capturing system is disposed separately from the image-capturing device of the TV-image-capturing system, the image quality of the still image can be made favorable.

Further, since a lens section having the same configuration as the lens section in the TV-image-capturing system disposed downstream the reflecting mirror, which is not in common in both of the above-mentioned systems, is disposed in the still-image-capturing system, and an optical block providing the passing luminous flux with an optical path length substantially equivalent to that of the color-decomposing prism in the TV-image-capturing system mounted in the camera main body is disposed in the still-image-capturing system, the optical characteristics of the still-image-capturing system can be made substantially identical to those of the TV-image-capturing system, whereby aberration can be made favorable in both systems.

Since a reflecting mirror is inserted in the space for inserting the EXT group, where a large lens space is formed in the TV lens attached to the TV camera main body, and the luminous flux deflected by the reflecting mirror is made incident on the still-image-capturing device, the TV lens equipped with a still-taking function in accordance with the second aspect of the present invention is convenient in that a single TV camera apparatus can take both the TV and still images without separately securing a space for inserting the reflecting mirror by changing the design of the TV lens.

When configured such that the reflecting mirror and the EXT group are positioned on the optical axis of the TV lens so as to be switchable therebetween, it is convenient in that it can enhance the magnification of the TV lens and take still images as required.

Also, since the lens sections in the TV-image-capturing system and still-image-capturing system are partly used in common, the apparatus as a whole can be made compact and cut down its cost. On the other hand, since the image-capturing device of the still-image-capturing system is disposed separately from the image-capturing device of the TV-image-capturing system, the image quality of the still image can be made favorable.

Further, if a lens section having the same configuration as the lens section in the TV-image-capturing system disposed downstream the reflecting mirror, which is not in common in both of the above-mentioned systems, is disposed in the still-image-capturing system, and an optical block for providing the passing luminous flux with an optical path length substantially equivalent to that of the color-decomposing prism in the TV-image-capturing system is disposed in the still-image-capturing system, then the optical characteristics of the still-image-capturing system can be made substantially identical to those of the TV-image-capturing system, whereby aberration can be made favorable in both systems.

Since a reflecting mirror is inserted in an inter-lens space of the TV lens attached to the TV camera main body, and the luminous flux deflected by the reflecting mirror is made incident on an electronic still camera, the TV lens equipped with a still-taking function in accordance with the third aspect of the present invention is convenient in that a single TV camera apparatus mounted with the electronic still camera can take both the TV and still images.

Also, since the lens sections in the TV-image-capturing system and still-image-capturing system are partly used in common, the apparatus as a whole can be made compact and cut down its cost. On the other hand, since the still-image-capturing system, to which an electronic still camera is attachable, is disposed separately from the image-capturing device of the TV-image-capturing system, the image quality of the still image can be made favorable.

Further, since a converter lens having such a focal length (magnification) that can make the respective angles of view of the TV-image-capturing system and still-image-capturing system coincide with each other while taking account of the difference in focal length between the lens section of the TV-image-capturing system disposed downstream the reflecting mirror and the taking lens of the electronic still camera which are not used in common and the difference in picture size between the image-capturing device of the TV-image-capturing system mounted in the camera main body and the image-capturing device of the electronic still camera is disposed between the reflecting mirror and the electronic still camera, the picture size of the image-capturing device and the imaging size of the object image can be made to coincide with each other as with the TV-image-capturing system.

Since a reflecting mirror is inserted downstream the TV lens attached to the TV camera main body or an inter-lens space thereof, and the luminous flux deflected by this reflecting mirror is made incident on the still-image-capturing device, the TV lens equipped with a still-taking function in accordance with the fourth aspect of the present invention is convenient in that a single TV camera apparatus can take both the TV and still images.

Also, since a mechanical shutter is inserted in an optical path between the reflecting mirror and the still-image-capturing device, and the shutter attains an open state only during a charge storage period of the image-capturing device, light can be inhibited from being made incident on the light-receiving surface thereof in the period other than the charge storage period, whereby smear can greatly be reduced, and images can be obtained with a high image quality.

Further, in the case where the signal transmission system of the still-image-capturing device is of an interlacing type, when the mechanical shutter is configured such as attain an open state only during the charge storage period of a first field, while charges for one frame are allowed to be stored during this period, the charge storage periods of the first and second fields temporally attain the same timing, thus making the respective video signals of both fields temporally coincide with each other, whereby no blurring will occur if one sheet of frame image is constructed by reproducing these video signals.

What is claimed is:

1. A TV lens equipped with a still-taking function having a plurality of lens groups attached to a front end of a TV camera main body mounted with a color-decomposing prism for decomposing, in terms of color, a luminous flux carrying object image information, said TV lens comprising:

a reflecting mirror, disposed at a predetermined inter-lens position in said plurality of lens groups, for guiding said luminous flux carrying object image information into a direction different from said TV camera main body; and a still-image-capturing device, irradiated with said luminous flux guided by said reflecting mirror into said direction different from said TV camera main body, for capturing a still image of said object image;

wherein, between said reflecting mirror and said still-image-capturing device, a still-image lens section formed into the same shape from the same material as a lens section positioned downstream said reflecting mirror, and an optical block for yielding, for a luminous flux incident on said still-image-capturing device, an optical path length substantially equivalent to an optical path length of said luminous flux incident on said color-decomposing prism within said prism are disposed.

2. A TV lens equipped with a still-taking function according to claim 1, wherein said reflecting mirror is a half mirror.

3. A TV lens equipped with a still-taking function according to claim 1, wherein said reflecting mirror is a total reflection mirror movable between a first mirror position for making said luminous flux directly incident on said TV camera main body and a second position for guiding said luminous flux to said still-image-capturing device.

4. A TV lens equipped with a still-taking function according to claim 1, wherein said optical block is an optical prism having a function for resetting an inversion of image posture caused by said reflecting mirror.

5. A TV lens equipped with a still-taking function having a lens system, attached to a front end of a TV camera main body, including a space adapted to insert a focal length conversion lens group therein, wherein, at the inter-lens space in said lens system in which said focal length conversion lens group is inserted, a reflecting mirror for guiding a luminous flux carrying object image information into a direction different from said TV camera main body is inserted.

6. A TV lens equipped with a still-taking function according to claim 5, wherein said reflecting mirror and said focal length conversion lens group are inserted at said inter-lens space so as to be switchable therebetweeen.

7. A TV lens equipped with a still-taking function according to claim 6, wherein said reflecting mirror and said focal length conversion lens group are mounted on a single planar member, an operation for switching insertion of said reflecting mirror and focal length conversion lens group at said inter-lens space being effected by pivoting or sliding said planar member.

8. A TV lens equipped with a still-taking function according to claim 7, wherein said reflecting mirror is a total reflection mirror, said planar member being provided with said total reflection mirror, said focal length conversion lens group, and a through hole section.

9. A TV lens equipped with a still-taking function according to claim 5, wherein said reflecting mirror is a half mirror.

10. A TV lens equipped with a still-taking function according to claim 5, further comprising a focal length conversion lens group.

11. A TV lens equipped with a still-taking function according to claim 10, wherein the focal length conversion group enhances the magnification of the TV lens when in the inter-lens space.

12. A TV camera equipped with a still-taking function having a plurality of lens groups attached to a front end of a TV camera main body mounted with a color-decomposing prism for decomposing, in terms of color, a luminous flux carrying object image information, said TV lens comprising:

a reflecting mirror, disposed at a predetermined inter-lens position where said luminous flux is substantially a parallel luminous flux in said plurality of lens groups, for guiding said luminous flux into a direction different from said TV camera main body; and a converter lens disposed between an electronic still camera and said reflecting mirror, said still camera having a relative position secured with respect to said plurality of lens groups and being adapted to take in said luminous flux guided by said reflecting mirror into said direction different from said TV camera main body so as to capture a still image of said object image, said converter lens being adapted to adjust a focal length of an optical system of a still-image-capturing system such that, according to a difference in focal length between a taking lens of said electronic still camera and a lens disposed downstream said reflecting mirror in said plurality of lens groups and a difference in image-capturing size between an image-capturing device disposed within said TV camera main body and an image-capturing device disposed within said electronic still camera, angles of view in said two image-capturing devices are substantially equivalent to each other.

13. A TV lens equipped with a still-taking function according to claim 12, wherein said reflecting mirror is a total reflection mirror movable between a first mirror position for making said luminous flux entering said plurality of lens groups directly incident on said TV camera main body and a second position for guiding said luminous flux to said electronic still camera.

14. A TV lens equipped with a still-taking function according to claim 12, wherein said reflecting mirror is a half mirror.

15. A TV lens equipped with a still-taking function according to claim 12, wherein said converter lens is made detachable with respect to a lens mount accommodating said plurality of lens groups.

16. A TV lens equipped with a still-taking function having a plurality of lens groups attached to a front end of a TV camera main body mounted with a color-decomposing prism for decomposing, in terms of color, a luminous flux carrying object image information, said TV lens comprising:

a reflecting mirror, disposed downstream said plurality of lens groups or at a predetermined inter-lens position in said plurality of lens groups, for guiding said luminous flux carrying object image information into a direction different from said TV camera main body; and a still-image-capturing device, irradiated with said luminous flux guided by said reflecting mirror into said direction different from said TV camera main body, for capturing a still image of said object image, wherein a mechanical shutter is inserted in an optical path between said reflecting mirror and said still-image-capturing device so as to cause said shutter to attain an open state only during a charge storage period of said still-image-capturing device.

17. A TV lens equipped with a still-taking function according to claim 16, wherein said reflecting mirror is a half mirror.

18. A TV lens equipped with a still-taking function according to claim 16, wherein said reflecting mirror is a total reflection mirror movable between a first mirror position for making said luminous flux directly incident on said TV camera main body and a second position for guiding said luminous flux to said still-image-capturing device.

19. A TV lens equipped with a still-taking function according to claim 16, wherein said still-image-capturing device has a signal transmission system of an interlacing type.

20. A TV lens equipped with a still-taking function according to claim 19, wherein said shutter is caused to attain the open state only during a first field charge storage period of said still-image-capturing device.

* * * * *